(12) United States Patent
Nabeto et al.

(10) Patent No.: US 12,017,345 B2
(45) Date of Patent: Jun. 25, 2024

(54) END EFFECTOR AND END EFFECTOR DEVICE

(71) Applicant: OMRON Corporation, Kyoto (JP)

(72) Inventors: Misato Nabeto, Kyoto (JP); Sayaka Doi, Joyo (JP); Hiroki Koga, Nara (JP)

(73) Assignee: OMRON CORPORATION, Kyoto (JP)

( * ) Notice: Subject to any disclaimer, the term of this patent is extended or adjusted under 35 U.S.C. 154(b) by 582 days.

(21) Appl. No.: 17/273,505

(22) PCT Filed: Mar. 11, 2019

(86) PCT No.: PCT/JP2019/009562
§ 371 (c)(1),
(2) Date: Mar. 4, 2021

(87) PCT Pub. No.: WO2020/066061
PCT Pub. Date: Apr. 2, 2020

(65) Prior Publication Data
US 2021/0213627 A1    Jul. 15, 2021

(30) Foreign Application Priority Data

Sep. 26, 2018    (JP) ................................. 2018-180741

(51) Int. Cl.
*B25J 15/08*    (2006.01)
*B25J 13/08*    (2006.01)

(52) U.S. Cl.
CPC ............. *B25J 15/08* (2013.01); *B25J 13/082* (2013.01); *B25J 13/084* (2013.01); *B25J 13/088* (2013.01)

(58) Field of Classification Search
None
See application file for complete search history.

(56) References Cited

U.S. PATENT DOCUMENTS

| 4,715,773 A | * | 12/1987 | Parker | ................... | B25J 13/082 |
| | | | | | 414/730 |
| 2013/0181466 A1 | | 7/2013 | Murakami et al. | | |
| 2017/0305017 A1 | | 10/2017 | Takebayashi et al. | | |

FOREIGN PATENT DOCUMENTS

| JP | S57205092 A | * | 12/1982 |
| JP | S57205092 A | | 12/1982 |

(Continued)

OTHER PUBLICATIONS

International Search Report for International Application No. PCT/JP2019/009562; dated Apr. 23, 2019.

(Continued)

*Primary Examiner* — Peter D Nolan
*Assistant Examiner* — Jacob Kent Besteman-Street
(74) *Attorney, Agent, or Firm* — CANTOR COLBURN LLP

(57) ABSTRACT

The end effector includes a palm, a plurality of fingers capable of grasping operation, a tactile sensor unit provided with each of the plurality of fingers, and a force receiving portion that receives a force from the object being grasped when the object being grasped is grasped by the plurality of fingers, the force receiving portion being connected to each of the plurality of fingers via the tactile sensor unit. The force receiving portion includes a grasping surface that receives a force from the object being grasped, the grasping surface being placed facing the object being grasped to be able to grasp the object being grasped, and a pressing surface that is placed further away from the palm than the second end portion of each of the plurality of fingers and extends in a direction intersecting the grasping surface.

10 Claims, 11 Drawing Sheets

(56) References Cited

FOREIGN PATENT DOCUMENTS

| JP | S60221287 A | 11/1985 |
| JP | H08323678 A | 12/1996 |
| JP | H0998520 A | 4/1997 |
| JP | 2012139808 A | 7/2012 |
| JP | 2015112662 A | 6/2015 |
| JP | 2015196208 A | 11/2015 |
| JP | 2016049597 A | 4/2016 |
| JP | 2017087325 A | 5/2017 |

OTHER PUBLICATIONS

PCT Written Opinion of the International Searching Authority for International Application No. PCT/JP2019/009562; dated Apr. 23, 2019.
JPO Notice of Reasons of Refusal for corresponding JP Application No. 2018-180741; dated May 11, 2021.
Chathuranga et al., "A Soft Three Axis Force Sensor Useful for Robot Grippers", IEEE/RSJ International Conference on Intelligent Robots and Systems (IROS); Daejeon Convention Center, Korea, Oct. 9-14, 2016; 8 pages.
EPO Extended European Search Report for corresponding EP Application No. 19867875.7; dated Apr. 26, 2022.
Van Wyk et al., "Comparative Peg-in-Hole Testing of a Force-Based Manipulation Controlled Robotic Hand", IEEE Transactions of Robotics, vol. 34, No. 2, Apr. 2018; pp. 542-549.

\* cited by examiner

END EFFECTOR AND END EFFECTOR DEVICE

CROSS REFERENCE TO RELATED APPLICATIONS

This is the U.S. national stage of application No. PCT/JP2019/009562, filed on Mar. 11, 2019. Priority under 35 U.S.C. § 119(a) and 35 U.S.C. § 365(b) is claimed from Japanese Application No. 2018-180741, filed Sep. 26, 2018, the disclosure of which is also incorporated herein by reference.

TECHNICAL FIELD

The present disclosure relates to an end effector including a tactile sensor unit, and to an end effector device including the end effector.

BACKGROUND ART

Patent Literature 1 discloses a robot control device including a force sense measuring device that acquires information on force sense acting on an object being grasped by a robot hand. This force sense measuring device is composed of a force sensor, and is provided at a portion of the robot hand that contacts with an object being grasped.

CITATION LIST

Patent Literature

PTL 1: JP 2017-087325 A

SUMMARY OF INVENTION

Technical Problem

When it is attempted to fit an object being grasped into a recess of an object to be assembled while grasping the object being grasped by the robot hand using the robot control device, the robot hand may contacts with the edge of the opening of the recess in the middle of fitting the object being grasped into the recess. In this case, in order to fit the object being grasped into the recess, it is necessary to rotate the robot hand by about 90 degrees and press the object being grasped with a portion where the force sense measuring device is provided. Thus, the structure and control of the robot hand may be complicated.

The present disclosure provides an end effector including a tactile sensor unit capable of fitting an object being grasped into a fitting recess of an object to be assembled with a simple configuration, and an end effector device including the end effector.

Solution to Problem

An end effector of an example of the present disclosure includes:
a palm;
a plurality of fingers capable of grasping operation in which each of the plurality of fingers moves in a direction intersecting an extending direction thereof as well as approaching each other and grasps an object being grasped, a first end portion of each of the plurality of fingers in the extending direction being connected to the palm;
a tactile sensor unit capable of detecting an external force from the object being grasped, the tactile sensor being provided at a second end portion of each of the plurality of fingers in the extending direction; and
a force receiving portion that receives a force from the object being grasped when the object being grasped is grasped by the plurality of fingers, the force receiving portion being connected to the second end portion of each of the plurality of fingers via the tactile sensor unit, wherein
the force receiving portion includes
a grasping surface that receives a force in the direction intersecting the extending direction, the grasping surface being placed facing the object being grasped in a direction intersecting the extending direction to be able to grasp the object being grasped, and
a pressing surface that receive a force in the extending direction, the pressing surface being placed further away from the palm than the second end portion of each of the plurality of fingers in the extending direction and extending in a direction intersecting the grasping surface.

An end effector device of an example of the present disclosure includes:
the end effector;
a drive device that drives the palm and each of the plurality of fingers; and
a control device that controls the drive device based on a detection result detected by the tactile sensor unit.

Advantageous Effects of Invention

The end effector includes a force receiving portion that is connected to the second end portion of each finger via the tactile sensor unit. The force receiving portion receives a force from the object being grasped when the object being grasped is grasped by the plurality of fingers. The force receiving portion includes a grasping surface and a pressing surface. The grasping surface is placed facing the object being grasped in a direction intersecting the extending direction to be able to grasp the object being grasped. The pressing surface is placed further away from the palm than the second end portion of each of the plurality of fingers and that extends in a direction intersecting the grasping surface. With such a configuration, for example, the object being grasped is grasped by the grasping surface of the force receiving portion and moved to the fitting recess of the object to be assembled and, then, the object being grasped is pressed against the object to be assembled with the pressing surface of the force receiving portion, so that the object being grasped is fitted into the fitting recess. That is, it is possible to realize an end effector including a tactile sensor unit capable of fitting the object being grasped into the fitting recess of the object to be assembled with a simple configuration.

According to the end effector device, it is possible to realize an end effector device capable of fitting an object being grasped into a fitting recess of an object to be assembled with a simple configuration by the end effector.

DESCRIPTION OF EMBODIMENTS

Hereinafter, an example of the present disclosure will be described with reference to the accompanying drawings. Note that, in the following description, although terms indicating a specific direction or position (for example, terms including "up", "down", "right", "left") will be used as necessary, they are used for facilitating understanding of the present disclosure with reference to the drawings, and the technical scope of the present disclosure is not limited by the meaning of those terms. It should be noted that the following description is merely exemplary in nature and is not intended to limit the present disclosure, its application, or its use. Furthermore, the drawings are schematic, and the ratios of the dimensions do not always match actual ones.

First Embodiment

Figure 1:
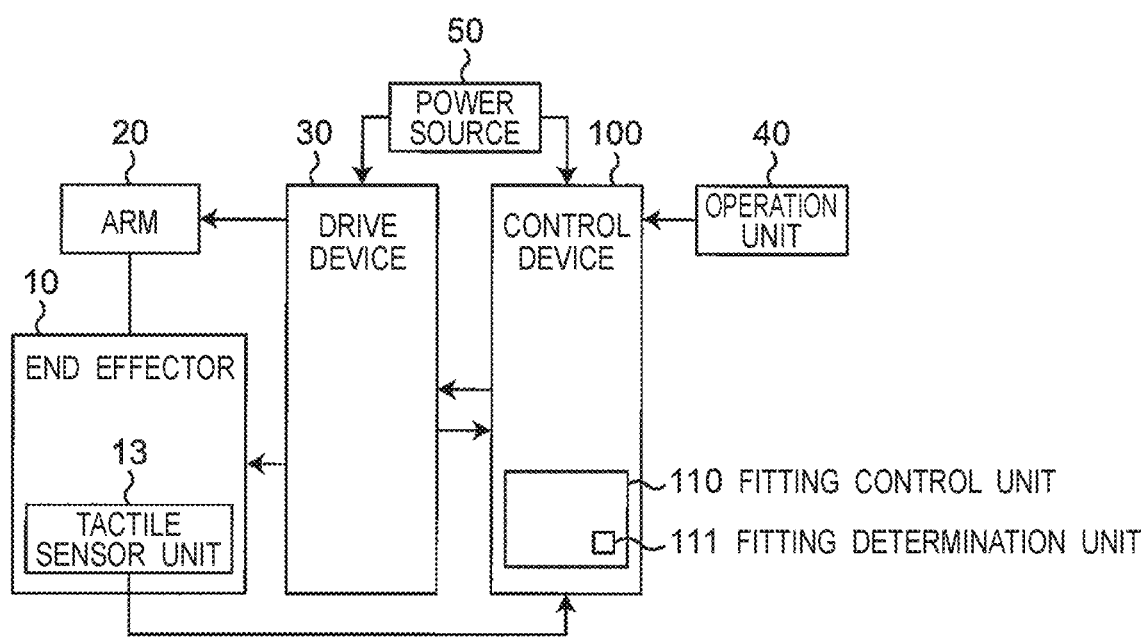
FIG. 1 is a block diagram showing an end effector device according to a first embodiment of the present disclosure.

An end effector 10 of the first embodiment of the present disclosure constitutes a part of an end effector device 1 such as a manipulator, for example, as shown in FIG. 1. As an example, the end effector device 1 includes an end effector 10, an arm 20 connected to the end effector 10, a drive device 30 that drives the end effector 10 and the arm 20, a control device 100 that controls the drive device 30, an operation unit 40 connected to the control device 100, and a power source 50 that supplies power to the drive device 30 and the control device 100. The control device 100 controls drive of the end effector 10 and the arm 20 by outputting a command to the drive device 30 based on operation received by the operation unit 40. The arm 20 is connected to a palm 11 described later of the end effector 10, and can move so as to be able to arbitrarily change a position and posture of the end effector 10 by the drive device 30. The drive device 30 has a motor (not shown) that drives the palm 11 and each finger 12, and an encoder (not shown) that detects the rotation of the motor, and is configured to output information detected by the encoder to the control device 100.

Figure 2:
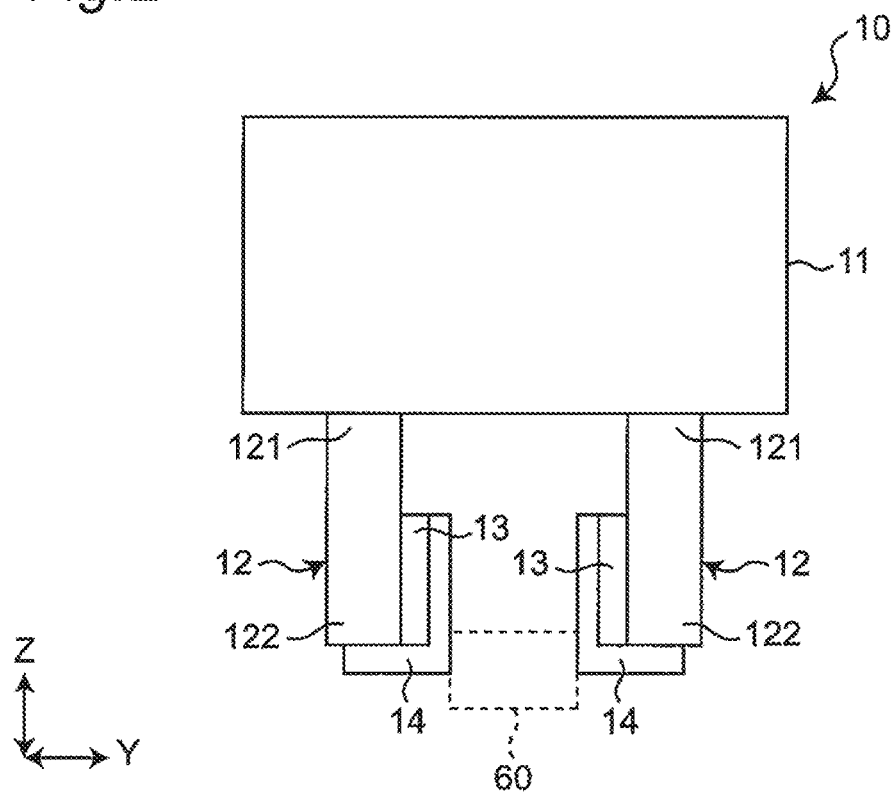
FIG. 2 is a front view showing an end effector of the end effector device of FIG. 1.
Figure 3:
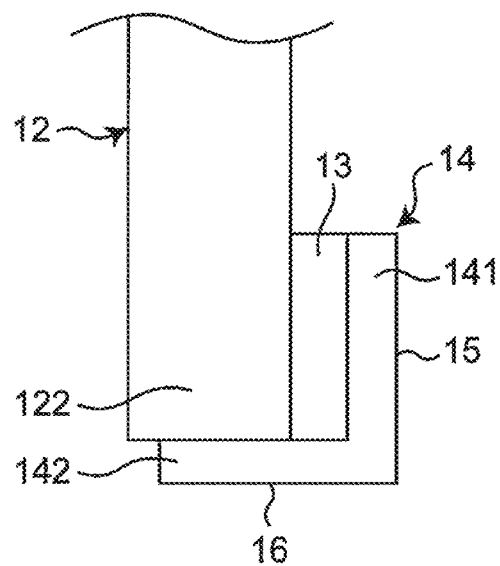
FIG. 3 is an enlarged front view showing a finger of the end effector of FIG. 2.

As shown in FIG. 2, the end effector 10 includes the palm 11, a plurality of fingers 12 (two fingers 12 in the first embodiment) connected to the palm 11, and a tactile sensor unit 13 and a force-receiving portion 14 provided at each finger 12.

Each finger 12 has a first end portion 121 provided with one end of each finger 12 in an extending direction of the finger 12. The first end portion 121 is connected to the palm 11. Each finger 12 is configured capable of grasping operation in which each finger 12 moves in a direction intersecting the extending direction thereof as well as approaching each other and grasps an object being grasped 60.

Specifically, as an example, each finger 12 has a substantially rectangular plate shape having substantially the same length in the extending direction thereof. Each finger 12 is placed side by side and substantially in parallel with another finger 12 so that their plate surfaces face each other. Each finger 12 is configured to be movable in a direction orthogonal to the plate surface by the drive device 30. The motor that drives each finger 12 may be configured by, for example, a linear motor.

Tactile sensor unit 13, for example, is configured of a capacitance type or resistance type planar tactile sensor. Tactile sensor unit 13 is provided at a second end portion 122, which is a tip portion provided with the other end of each finger 12 in the extending direction thereof, in a state capable of detecting an external force from the object being grasped 60.

Specifically, each tactile sensor unit 13 is configured to be able to detect an external force in at least three axial directions by detecting a minute displacement/deformation as an electrical change, the minute displacement/deformation being caused by force that each force-receiving portion 14 receives from the object being grasped 60. In this embodiment, as shown in FIG. 2, tactile sensor unit 13 is configured to be able to detect at least a force in a Z direction along the extending direction of each finger 12, a force in a Y direction orthogonal to the Z direction and directed from one finger 12 to the other finger 12, and a force in a X direction (that is, the paper penetration direction in FIG. 2) orthogonal to the Z direction and the Y direction.

Each force-receiving portion 14 is configured of metal, as an example. Each force-receiving portion 14 is connected to the second end portion 122 of each of the plurality of fingers 12 via the tactile sensor unit 13. Each force-receiving portion 14 is configured to receive a force from the object being grasped 60 when the object being grasped 60 is grasped by the plurality of fingers 12.

Specifically, each force-receiving portion 14 includes a first plate member 141 extending in the extending direction of each finger 12 and a second plate member 142 extending in a direction intersecting (for example, orthogonal to) the first plate member 141 as well as being away from each other.

The first plate member 141 has a grasping surface 15. The grasping surface 15 is placed facing the object being grasped 60 in a direction intersecting the extending direction of each finger 12 to be able to grasp the object being grasped 60. The grasping surface 15 receives a force in the direction intersecting the extending direction of each finger 12. Further, the second plate member 142 has a pressing surface 16. The pressing surface 16 is placed further away from the palm 11 than the second end portion 122 of each finger 12 in the extending direction of each finger 12. The pressing surface 16 extends in the direction intersecting (for example, orthogonal to) the grasping surface 15. The pressing surface 16 receives a force in the extending direction of each finger 12. That is, the force-receiving portion 14 covers the tactile sensor unit 13 in the extending direction of each finger 12 and in the direction intersecting the extending direction of each finger 12.

Next, the control device 100 of the end effector device 1 will be described.

The control device 100 includes a CPU that performs calculation, a storage medium such as a ROM and a RAM that store program, data, or the like necessary for control of the end effector 10, and an interface unit that performs input/output of signals with an outside of the end effector device 1. The control device 100 includes a fitting control unit 110 as shown in FIG. 1. The fitting control unit 110 is a function realized by the CPU executing a predetermined program.

Figure 4:
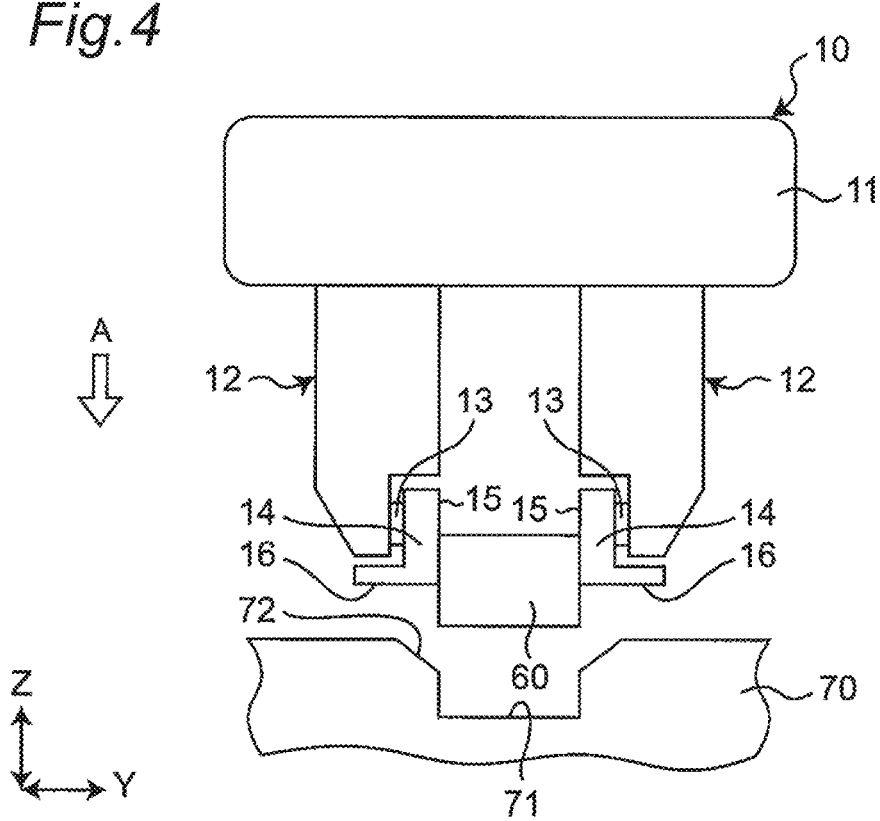
FIG. 4 is a first diagram for explaining a fitting process of the end effector device of FIG. 1.

The fitting control unit 110 presses the object being grasped 60 against the object to be assembled 70 with the pressing surface 16 so that the object being grasped 60 is fitted into the fitting recess 71 when the tactile sensor unit 13 detects that the pressing surface 16 of the force-receiving portion 14 contacts with an opening edge 72 of the fitting recess 71 in a case where the palm 11 approaches a fitting recess 71 of an object to be assembled 70 (see FIG. 4) from the Z direction (that is, the palm 11 moves in an arrow A direction in FIG. 4) and the object being grasped 60 is fitted into the fitting recess 71 in a state where the object being grasped 60 is grasped by each finger 12.

Figure 5:
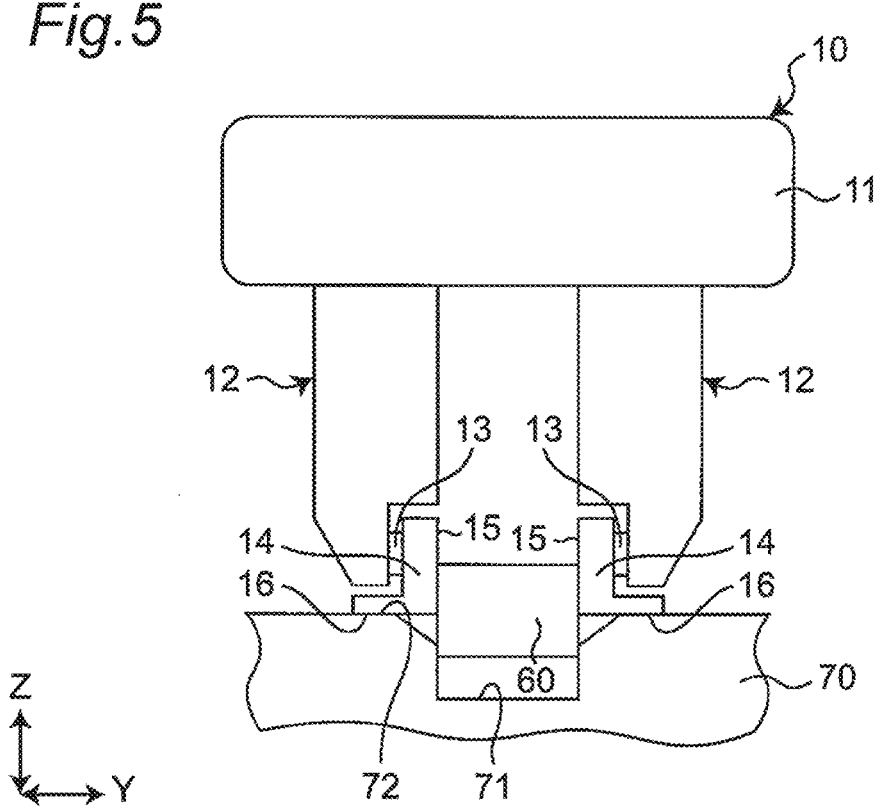
FIG. 5 is a second diagram for explaining the fitting process of the end effector device of FIG. 1.
Figure 6:
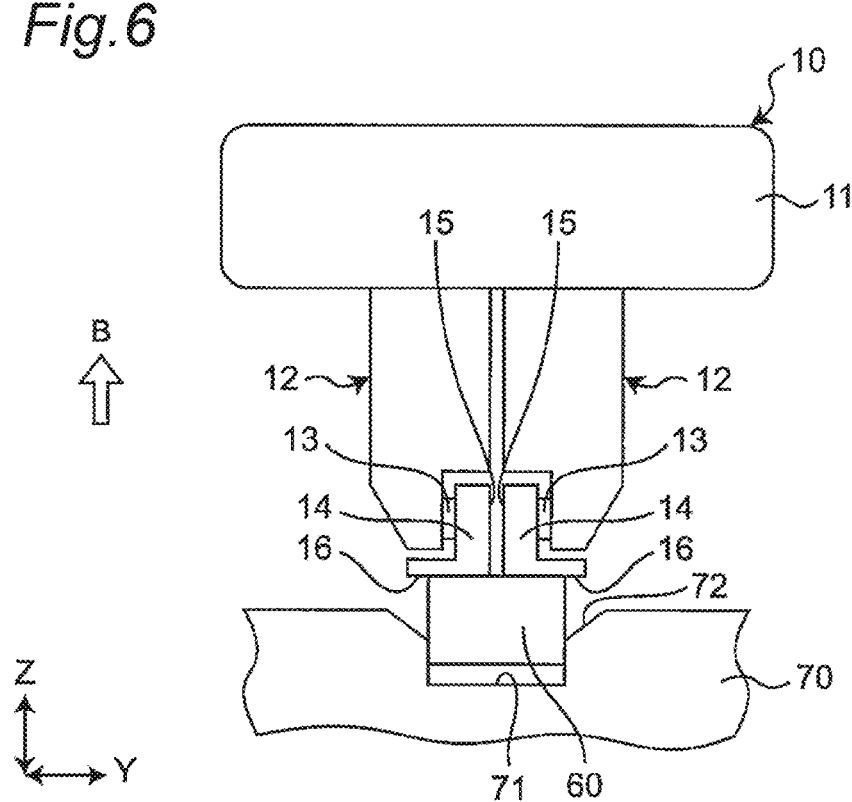
FIG. 6 is a third diagram for explaining the fitting process of the end effector device of FIG. 1.
Figure 7:
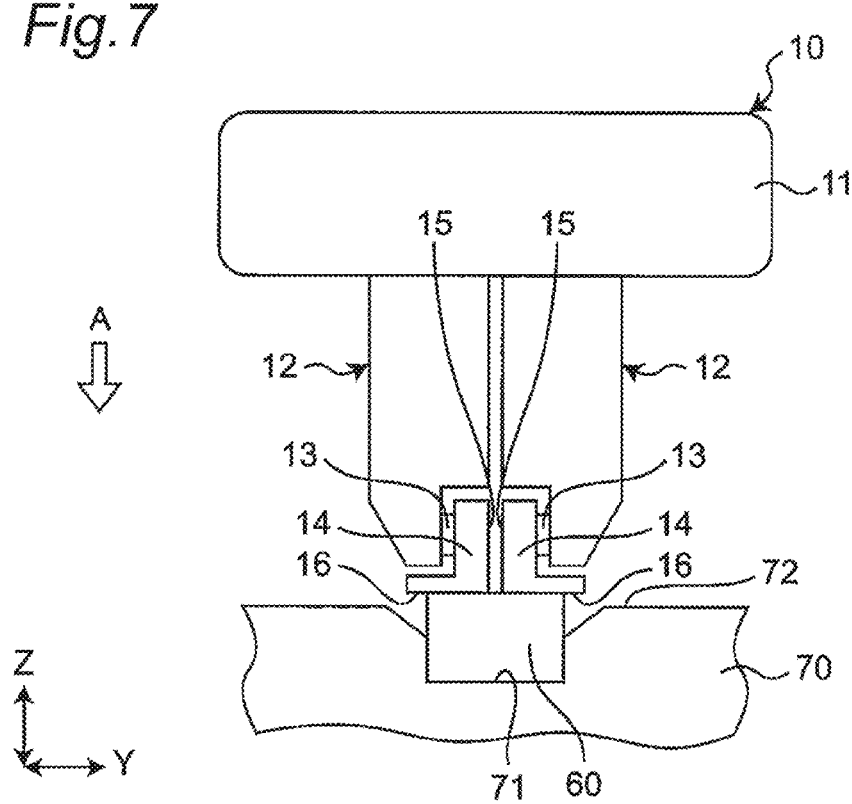
FIG. 7 is a fourth diagram for explaining the fitting process of the end effector device of FIG. 1.

Specifically, as shown in FIG. 5, when the tactile sensor unit 13 detects that the pressing surface 16 of the force-receiving portion 14 contacts with the opening edge 72 of the fitting recess 71, as shown in FIG. 6, the fitting control unit 110 releases grasp of the object being grasped 60 by each finger 12, and moves the palm 11 in a direction B away from the fitting recess 71 of the object to be assembled 70 in the Z direction. Then, as shown in FIG. 7, the fitting control unit 110 makes the palm 11 approach the fitting recess 71 of the object to be assembled 70 from the Z direction, again, in a state in which each finger 12 approaches each other and closed in the Y direction (that is, the direction intersecting the extending direction of each finger 12), to press the object being grasped 60 against the object to be assembled 70 with the pressing surface 16, thereby fitting the object being grasped 60 into the fitting recess 71.

A movement of the palm 11 in the direction B away from the fitting recess 71 of the object to be assembled 70 in the Z direction is performed until the palm 11 reaches a position at which the second end portion 122 of each finger 12 is further away from the fitting recess 71 of the object to be assembled 70 than the object being grasped 60 in the Z direction. The fitting control unit 110 calculates an amount of movement of the palm 11 based on information output from an encoder that detects a rotation of the motor of the drive device 30 that drives the palm 11, for example.

The fitting control unit 110 further includes a fitting determination unit 111 that determines whether the fitting of the object being grasped 60 into the fitting recess 71 is completed based on the detection result detected by each tactile sensor unit 13 when pressing the object being grasped 60 against the object to be assembled 70 with the pressing surface 16 to fit the object being grasped 60 into the fitting recess 71.

For example, when the palm 11 approaches the fitting recess 71 of the object to be assembled 70 from the Z direction in a state where the object being grasped 60 is grasped by each finger 12, the fitting determination unit 111 determines that the pressing surface 16 of the force-receiving portion 14 contacts with the opening edge 72 of the object to be assembled 70, as shown in FIG. 5, when the force in the Z direction detected by each tactile sensor unit 13 is a specified value (for example, 2N) or more. The specified value is determined in advance according to a dimensional configuration of each finger 12, or a shape, size, material, and the like of the object being grasped 60.

With each finger 12 closed, when the palm 11 approaches the fitting recess 71 of the object to be assembled 70 from the Z direction and pressing the object being grasped 60 against the object to be assembled 70 with the pressing surface 16, the fitting determination unit 111 determines that the fitting of the object being grasped 60 into the fitting recess 71 is completed, as shown in FIG. 7, when the force in the Z direction detected by each tactile sensor unit 13 is a specified value (for example, 5N) or more. When it is determined that the fitting of the object being grasped 60 into the fitting recess 71 is completed, the fitting control unit 110 stops the palm 11 from moving close to the fitting recess 71 of the object to be assembled 70.

It may be configured that whether the fitting of the object being grasped 60 into the fitting recess 71 is completed is determined based on both the detection result detected by each tactile sensor unit 13 and the information output from the encoder.

Subsequently, with reference to FIG. 11, a fitting process for fitting the object being grasped 60 into the fitting recess 71 of the object to be assembled 70 will be described. The fitting process described below is performed by the control device 100 executing a predetermined program.

Figure 11:
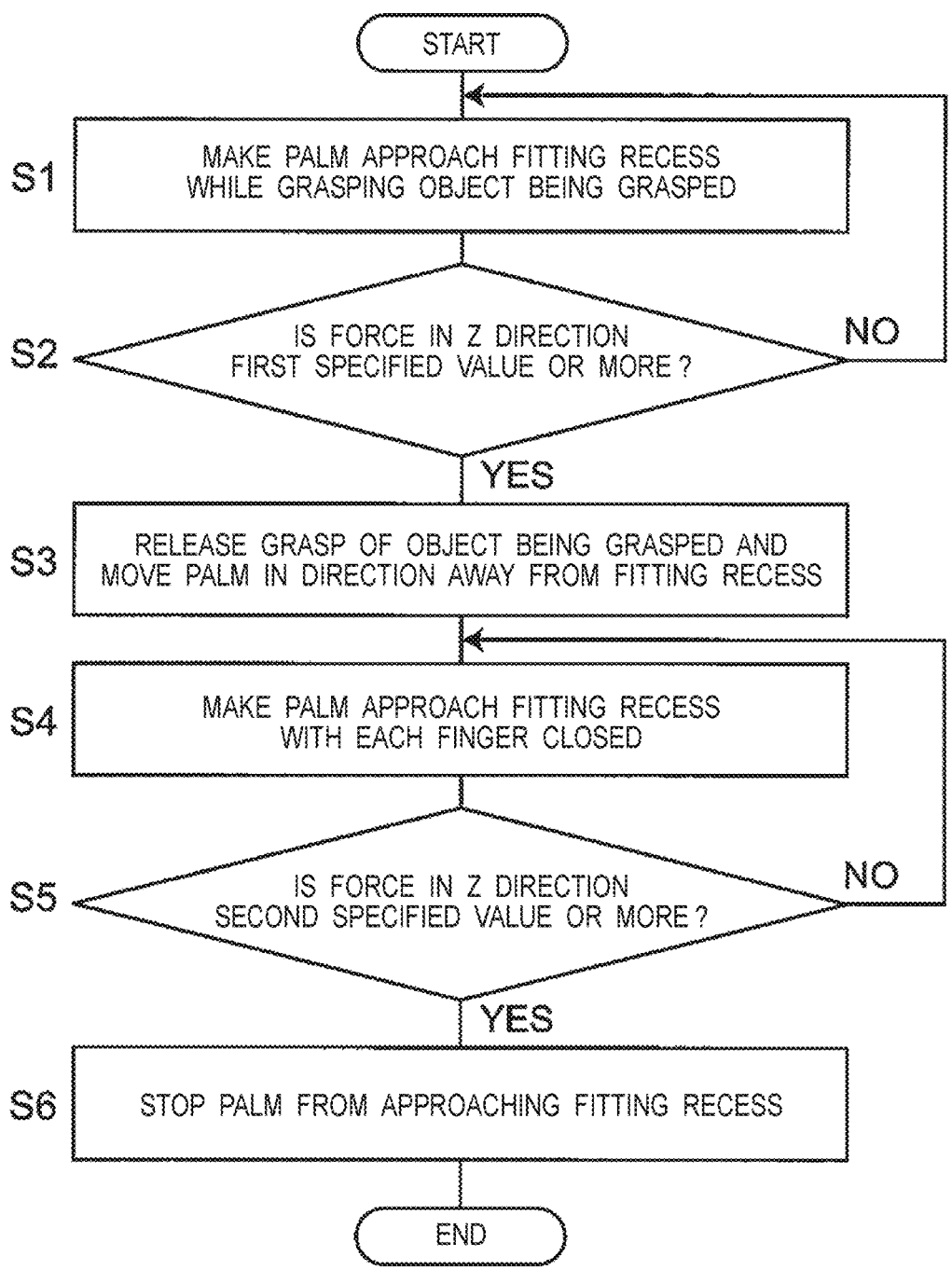
FIG. 11 is a flowchart for explaining the fitting process of the end effector device of FIG. 1.

As shown in FIG. 11, when the fitting process is started, the fitting control unit 110 makes the palm 11 move close to the fitting recess 71 of the object to be assembled 70 with the object being grasped 60 grasped by each finger 12 (step S1).

At this time, the fitting determination unit 111 determines whether the force in the Z direction detected by each tactile sensor unit 13 is the first specified value (for example, 2N) or more (step S2). When it is determined that the force in the Z direction detected by each tactile sensor unit 13 is less than the first specified value, the step S2 is repeated until the force in the Z direction detected by each tactile sensor unit 13 is the first specified value or more.

When it is determined that the force in the Z direction detected by each tactile sensor unit 13 is the first specified value or more, the fitting determination unit 111 determines that the pressing surface 16 of the force-receiving portion 14 contacts with the opening edge 72 of the object to be assembled 70. As a result, the fitting control unit 110 stops the palm 11 from moving close to the fitting recess 71 of the object to be assembled 70, releases the grasp of the object being grasped 60 by each finger 12, and moves the palm 11 in the direction B away from the fitting recess 71 of the object to be assembled 70 (step S3).

When the palm 11 moves in the direction B away from the fitting recess 71 of the object to be assembled 70, and the second end portion 122 of each finger 12 reaches a position at which the second end portion 122 further away from the fitting recess 71 of the object to be assembled 70 than the object being grasped 60, the fitting control unit 110 stops the palm 11 from moving in the direction B away from the fitting recess 71 of the object to be assembled 70, and makes the palm 11 approach the fitting recess 71 of the object to be assembled 70, again, with each finger 12 approached to each other and closed (step S4).

At this time, the fitting determination unit 111 determines whether the force in the Z direction detected by each tactile sensor unit 13 is a second specified value (for example, 5N) or more (step S5). When the force detected by each tactile sensor unit 13 is less than the second specified value, the step S5 is repeated until a predetermined force is detected by each tactile sensor unit 13.

When it is determined that the force in the Z direction detected by each tactile sensor unit 13 is the specification or more, the fitting determination unit 111 determines that the fitting of the object being grasped 60 into the fitting recess 71 is completed. As a result, the fitting control unit 110 stops the palm 11 from moving close to the fitting recess 71 of the object to be assembled 70 again (step S6), and the fitting process of the object being grasped 60 into the fitting recess 71 is completed.

The fitting recess 71 of the object to be assembled 70 may include, for example, a through hole penetrating in the Z direction.

The end effector 10 of the first embodiment includes the force-receiving portion 14 that is connected to the second end portion 122 of each finger 12 via the tactile sensor unit 13 and that receives a force from the object being grasped 60 when the object being grasped 60 is grasped by the plurality of fingers 12. The force-receiving portion 14 includes the grasping surface 15 and the pressing surface 16. The grasping surface 15 is placed facing the object being grasped 60 in a direction intersecting the extending direction of each finger 12 to be able to grasp the object being grasped 60. The pressing surface 16 is placed further away from the palm 11 than the second end portion 122 of each finger 12 in the extending direction of each finger 12 and extends in a direction intersecting the grasping surface 15. With such a configuration, for example, after grasping it by the grasping surface 15 of the force-receiving portion 14 and moving the object being grasped 60 to the fitting recess 71 of the object to be assembled 70, it is possible to press the object being grasped 60 against the object to be assembled 70 with the pressing surface 16 of the force-receiving portion 14 to fit the object being grasped 60 into the fitting recess 71. That is, it is possible to realize an end effector 10 including a tactile sensor unit 13 capable of fitting the object being grasped 60 into the fitting recess 71 of the object to be assembled 70 with a simple configuration.

The force-receiving portion 14 covers the tactile sensor unit 13 in the extending direction of each finger 12 and in a direction intersecting the extending direction of each finger 12. With such a configuration, it is possible to more reliably press the object being grasped 60 against the object to be assembled 70 with the pressing surface 16 of the force-receiving portion 14.

According to the end effector device 1 of the first embodiment, it is possible to realize the end effector device 1 capable of fitting the object being grasped 60 into the fitting recess 71 of the object to be assembled 70 with a simple configuration by the end effector 10.

The control unit 100 includes the fitting control unit 110. In a case where the tactile sensor unit 13 detects that the pressing surface 16 of the force-receiving portion 14 contacts with the opening edge 72 of the fitting recess 71 when the palm 11 approaches the fitting recess 71 of the object to be assembled 70 in a state where the object being grasped 60 is grasped by each finger 12 to fit the object being grasped 60 into the fitting recess 71, the fitting control unit 110 fits the object being grasped 60 into the fitting recess 71 by making the palm 11 approach the object being grasped 60 and pressing the object being grasped 60 against the object to be assembled 70 with the pressing surface 16 in a state where each finger 12 approaches each other in the direction intersecting the extending direction of each finger 12 and is closed after releasing the grasp of the object being grasped 60 by each finger 12 and moving the palm 11 in the direction B away from the object being grasped 60. It is possible to realize the end effector device 1 capable of fitting the object being grasped 60 into the fitting recess 71 of the object to be assembled 70 with a simple control process by the fitting control unit 110.

Since the object being grasped 60 is pressed against the object to be assembled 70 in a state where each finger 12 approaches each other in the direction intersecting the extending direction of each finger 12 and closed, as compared with the case where the object being grasped 60 is fitted into the fitting recess 71 with the object being grasped 60 grasped by each finger 12, or as compared with the case where the object being grasped 60 is pressed using any of the fingers 12 against the object to be assembled 70 with each finger 12 open to each other, the load applied to each finger 12 is reduced. As a result, a highly durable end effector device 1 can be realized.

The fitting control unit 110 further includes the fitting determination unit 111 that determines whether the fitting of the object being grasped 60 into the fitting recess 71 is completed based on the detection result detected by each tactile sensor unit 13 when pressing the object being grasped 60 against the object to be assembled 70 with the pressing surface 16 and fitting the object being grasped 60 into the fitting recess 71. The fitting determination unit 111 makes it possible reliably to fit the object being grasped 60 into the fitting recess 71 of the object to be assembled 70.

It is sufficient that the end effector 10 includes a palm 11, a plurality of fingers 12 capable of grasping operation of grasping the object being grasped 60, a tactile sensor unit 13 capable of detecting an external force from the object being grasped 60, and a force-receiving portion 14 having a grasping surface 15 and a pressing surface 16. The end effector 10 is not limited to the configuration of the first embodiment.

In the end effector 10 of the first embodiment, it is sufficient that the tactile sensor unit 13 is provided at the second end portion 122 of each finger 12 and configured to be able to detect an external force from the object being grasped 60. The configuration and type of the end effector 10 may be set according to the dimensional configuration of each finger 12 or the shape, size, material, and the like of the object being grasped 60.

Figure 8:
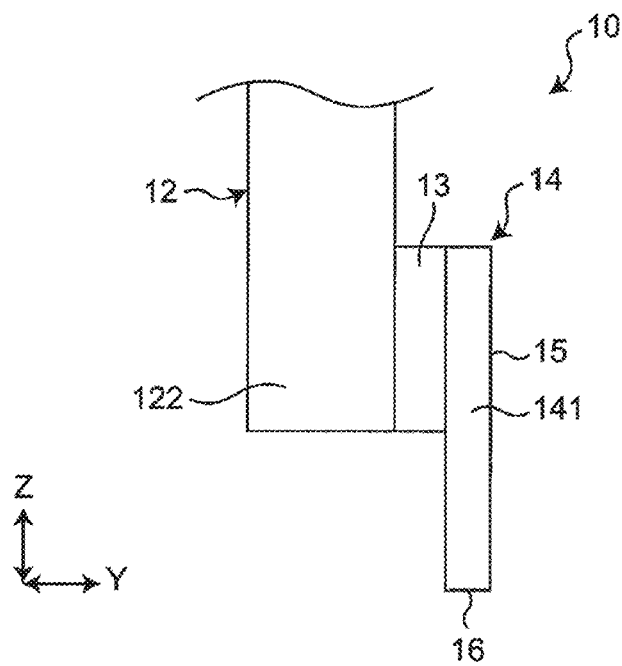
FIG. 8 is an enlarged front view of a finger showing a first modification of the end effector of FIG. 2.

The force-receiving portion 14 is not limited to the case where it is configured by the first plate member 141 and the second plate member 142. For example, as shown in FIG. 8, the force-receiving portion 14 may be configured of only the first plate member 141. In this case, a tip surface of the first plate member 141 farther from the palm 11 in the Z direction constitutes the pressing surface 16.

Figure 9:
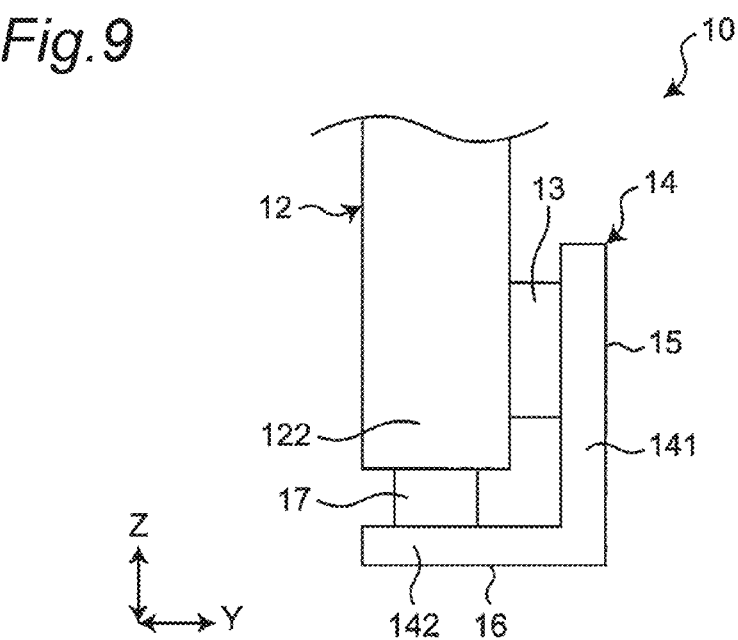
FIG. 9 is an enlarged front view of a finger showing a second modification of the end effector of FIG. 2.

The force-receiving portion 14 may be configured to include a connecting portion 17 provided on either the first plate member 141 or the second plate member 142, for example, as shown in FIG. 9. The connecting portion 17 may be configured of, for example, an elastic member such as metal or rubber. In the end effector 10 of FIG. 9, as an example, the first plate member 141 is connected to the finger 12 via the tactile sensor unit 13, and the second plate member 142 is connected to the finger 12 via the connecting portion 17. With such a configuration, the durability of the force-receiving portion 14 can be improved.

Figure 10:
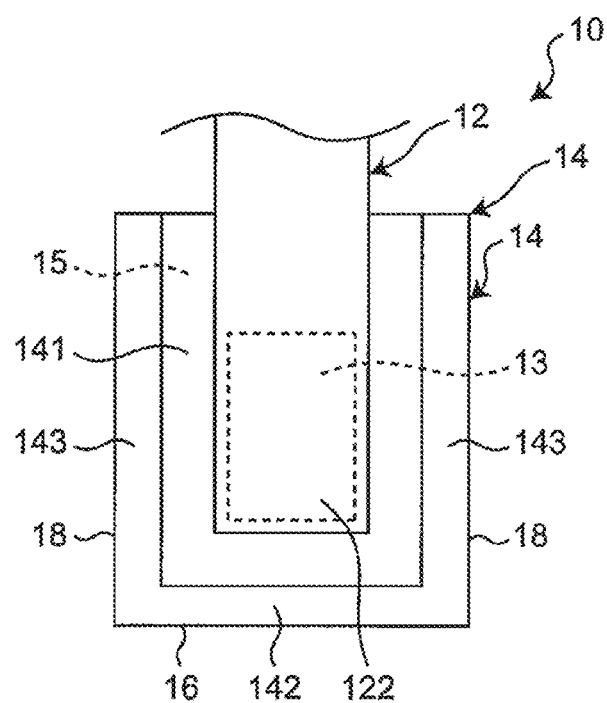
FIG. 10 is an enlarged front view of a finger showing a third modification of the end effector of FIG. 2.

The force-receiving portion 14 may be configured to include, for example, as shown in FIG. 10, a first pressing surface 16 and a second pressing surface 18 extending in a direction intersecting the grasping surface 15 and the first pressing surface 16. The end effector 10 of FIG. 10 includes the first plate member 141 having the grasping surface 15, the second plate member 142 having the first pressing surface 16, and a third plate member 143 having the second pressing surface 18. The third plate member 143 intersects (for example, orthogonal to) the first plate member 141 and the second plate member 142. With such a configuration, the object being grasped 60 can be fitted into the fitting recess 71 of the object to be assembled 70 in various aspects.

An elastic member such as metal or rubber may be attached to surfaces constituting the grasping surface 15 and the pressing surface 16 of the first plate member 141 and the second plate member 142. With such a configuration, physical characteristics such as a friction coefficient of the grasping surface 15 and the pressing surface 16 can be changed as needed. In addition, a maintainability of the force-receiving portion 14 can be improved.

In this way, it is sufficient that the force-receiving portion 14 includes a grasping surface 15 and a pressing surface 16. The grasping surface 15 is placed facing the object being grasped 60 in a direction intersecting the extending direction of each finger 12 (for example, the Y direction) to be able to grasp the object being grasped 60 and receives a force in a direction intersecting the extending direction of each finger 12. The pressing surface 16 is placed further away from the palm 11 than the second end portion 122 of each finger 12 in the extending direction (for example, Z direction) of each finger 12 and extends in a direction intersecting the grasping surface 15 to receive a force in the extending direction of each finger 12. The grasping surface 15, the pressing surface 16 and each member constituting the force-receiving portion 14 may have shapes and sizes that is appropriately set according to the dimensional configuration of each finger 12, the shape, size and material of the object being grasped 60, or the like.

Second Embodiment

Figure 12:
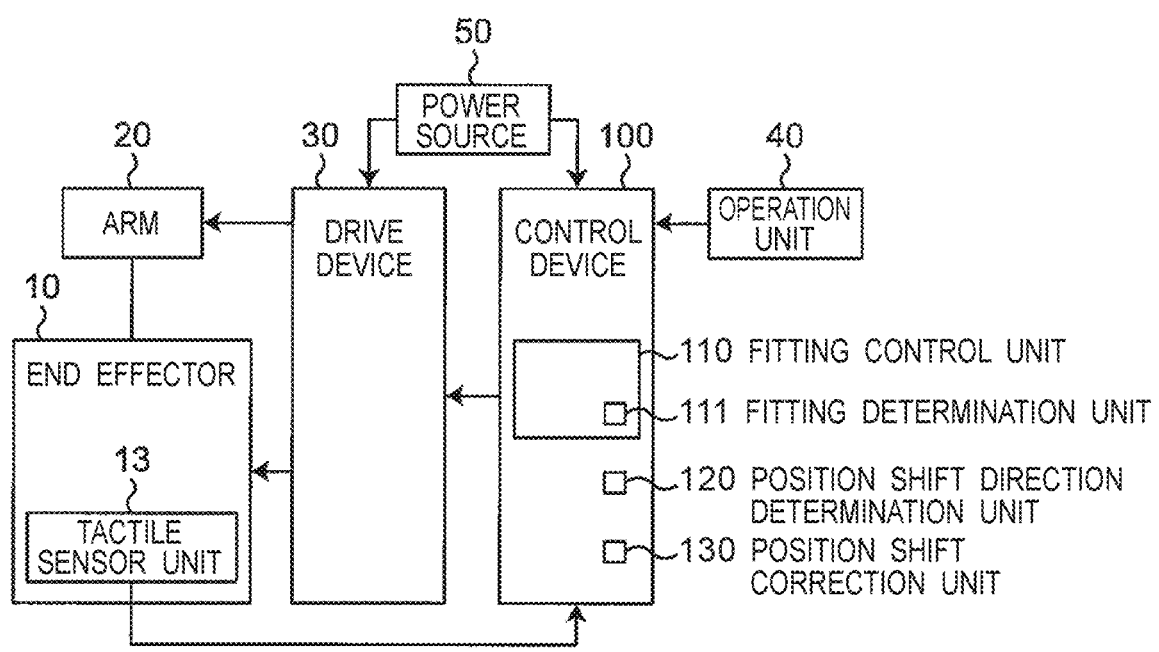
FIG. 12 is a block diagram showing an end effector device according to a second embodiment of the present disclosure.

The end effector device 1 of the second embodiment of the present disclosure differs from the first embodiment, as shown in FIG. 12, in that the control device 100 includes a position shift direction determination unit 120 and a position shift correction unit 130 in addition to the fitting control unit 110. In the second embodiment, the same parts as those in the first embodiment are designated by the same reference numbers, the description thereof will not be repeated, and the points different from those in the first embodiment will be described.

Each of the position shift direction determination unit 120 and the position shift correction unit 130 is a function realized by the CPU executing a predetermined program.

The position shift direction determination unit 120 determines in which direction the object being grasped 60 is position-shifted with respect to the fitting recess 71 based on the detection result detected by each of the tactile sensor units 13 in a case where at least one of the external forces in at least three axial directions detected by each tactile sensor unit 13 is a specified value or more when the palm 11 approaches the fitting recess 71 of the object to be assembled 70 in a state where the object being grasped 60 is grasped by each finger 12 and fitting the object being grasped 60 into the fitting recess 71 (for example, in a case where the force in the Z direction detected by each tactile sensor unit 13 is 2N or more, and it is determined by the fitting determination unit 111 that the object being grasped 60 and the opening edge 72 of the fitting recess 71 are in contact with each other).

Figure 13:
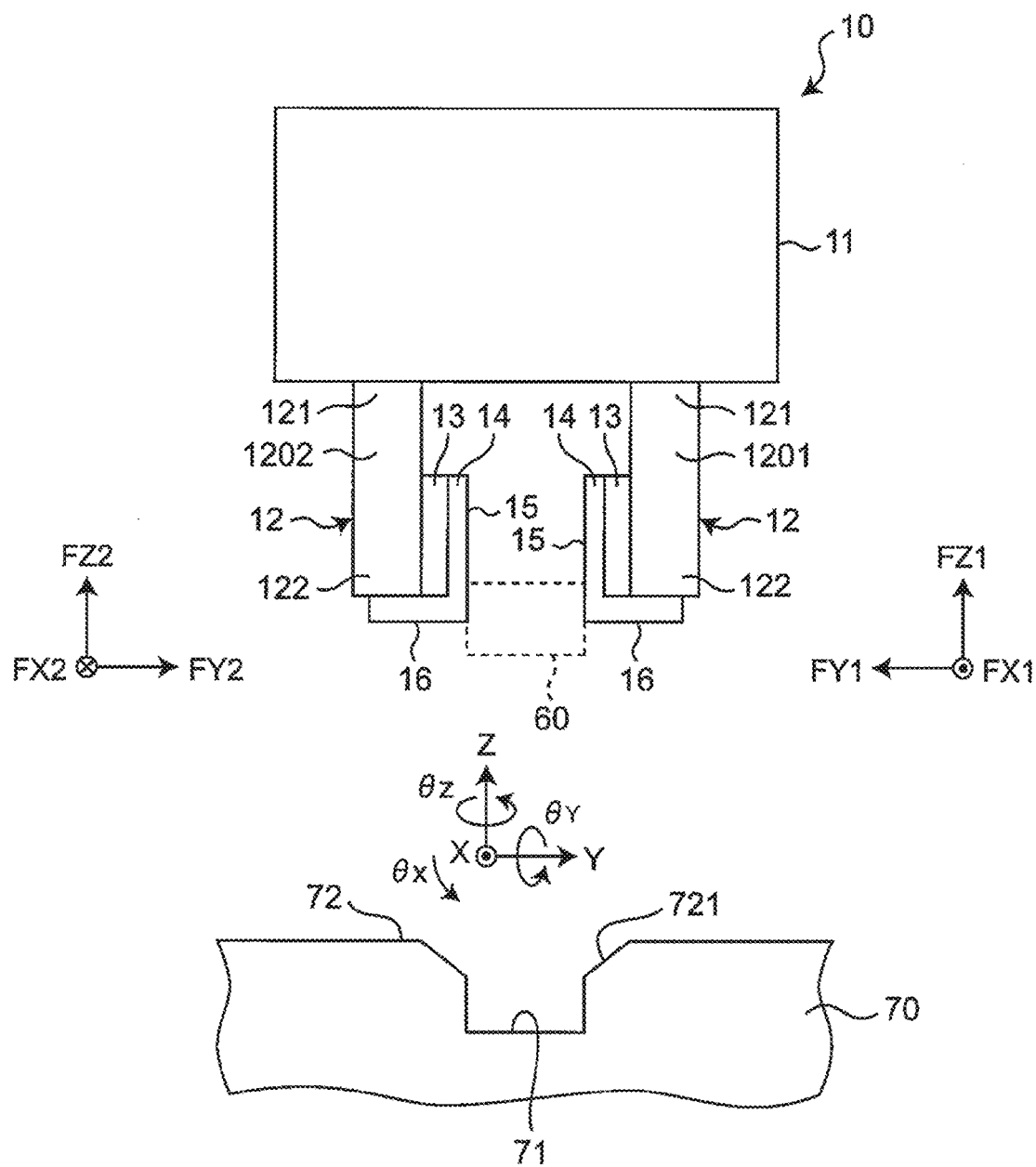
FIG. 13 is a front view for explaining a coordinate system of the end effector device of FIG. 12.

For example, forces in the X, Y, and Z directions detected by each tactile sensor unit 13 placed on the right finger 12 in FIG. 2 (hereinafter referred to as a first finger 1201) of the two fingers 12 are FX1, FY1, and FZ1, respectively. Forces in the X, Y, and Z directions detected by each tactile sensor unit 13 placed on the left finger 12 in FIG. 2 (hereinafter referred to as a second finger 1202) of the two fingers 12 are FX2, FY2, and FZ2, respectively. FIG. 13 shows a coordinate system of the tactile sensor unit 13 of the first finger 1201, a coordinate system of the tactile sensor unit 13 of the second finger 1202, and a coordinate system of the object being grasped 60.

In this case, the position shift direction determination unit 120 determines in which of the three axial directions the position shift of the object being grasped 60 with respect to the fitting recess 71 occurs based on a sum or difference of the forces in the X, Y, and Z directions detected by each tactile sensor unit 13 when it is determined that the object being grasped 60 contacts with the opening edge 72 of the fitting recess 71.

For example, a position shift of the object being grasped 60 with respect to the fitting recess 71 in the Y direction is determined by a difference in force in the Y direction (that is, FY1−FY2) or a difference in force in the Z direction (that is, FZ1−FZ2). When FY1−FY2 or FZ1−FZ2 is a positive value, it is determined that the object being grasped 60 is position-shifted in a positive direction of Y with respect to the fitting recess 71.

When an inclined surface 721 is formed on the opening edge 72 of the fitting recess 71, the position shift of the object being grasped 60 with respect to the fitting recess 71 in the Y direction is determined by the difference in force in the Z direction (that is, FZ1−FZ2) before it is determined that the object being grasped 60 contacts with the opening edge 72 (that is, the inclined surface 721) of the object to be assembled 70 and is determined by the difference in force in the Y direction (that is, FY1−FY2) after it is determined that the object being grasped 60 contacts with the opening edge 72 of the object to be assembled 70.

A position shift of the object being grasped 60 with respect to the fitting recess 71 in the X direction is determined by a difference in force in the X direction (that is, FX1−FX2). When FX1−FX2 is a negative value, it is determined that the object being grasped 60 is shifted in a positive direction of X with respect to the fitting recess 71.

A position shift of the object being grasped 60 with respect to the fitting recess 71 around the Z direction is determined by a sum of forces in the X direction (that is, FX1+FX2). When FX1+FX2 is a positive value, it is determined that the object being grasped 60 is shifted around a rotation direction shown by OZ in FIG. 13 (that is, counterclockwise when viewed in a direction from the positive position on the Z axis toward the origin).

The position shift direction determination unit 120 determines whether to complete the correction of position shift of the object being grasped 60 with respect to the fitting recess 71 based on whether one or more of or all of a sum and differences of the external forces in the same axial direction among the external forces in the three axial directions detected by each tactile sensor unit 13 (for example, FX1−FX2, FY1−FY2, FZ1−FZ2, FX1+FX2) are a specified value (for example, 0.1N) or less. This specified value is determined in advance according to the dimensional configuration of each finger 12 or the shape, size, material, and the like of the object being grasped 60.

The position shift direction determination unit 120 may determine whether the object being grasped 60 contacts the opening edge 72 of the fitting recess 71 at one point based on the difference in force in the X direction (that is, FX1−FX2) and the difference in force in the Z direction (that is, FZ1−FZ2). When the object being grasped 60 contacts the opening edge 72 at one point, the object being grasped 60 is position-shifted with respect to the fitting recess 71 around the X direction (that is, around a θX direction in FIG. 13) and/or around the Y direction (that is, around a θY direction in FIG. 13).

The position shift correction unit 130 controls the drive device 30 to move the object being grasped 60 in a direction opposite to a position shift direction (in other words, in a direction having the same axis as and the different direction from the position shift direction) of the object being grasped 60 with respect to the fitting recess 71 determined by the position shift direction determination unit 120, thereby correcting the position shift of the object being grasped 60 with respect to the fitting recess 71.

For example, it is assumed that the position shift direction determination unit 120 determines that the object being grasped 60 is shifted in the positive direction of X with respect to the fitting recess 71. In this case, the position shift correction unit 130 controls the drive device 30 to drive at least one of the palm 11 and each finger 12 so that the object being grasped 60 moves in a negative direction of X by a specified amount (for example, 0.05 mm).

When correcting the position shift of the object being grasped 60 with respect to the fitting recess 71, in a case where the sum of forces in the Z direction (that is, FZ1+FZ2) detected by each tactile sensor unit 13 exceeds a specified value (for example, 2N), and it is determined by the position shift direction determination unit 120 that the object being grasped 60 contacts with the opening edge 72 of the fitting recess 71, the position shift correction unit 130 temporarily suspends the position shift correction, and moves the object being grasped 60 in the Z direction as well as a direction away from the fitting recess 71 of the object to be assembled 70, until the sum of forces in the Z direction (that is, FZ1+FZ2) detected by each tactile sensor unit 13 is the specified value (for example, 2N) or less.

When correcting the position shift of the object being grasped 60 with respect to the fitting recess 71, in a case where the sum of forces in the Z direction detected by each tactile sensor unit 13 is less than a specified value (for example, 1N) (that is, FZ1+FZ2<1N), the position shift direction determination unit 120 determines that the contact of the object being grasped 60 with respect to the opening edge 72 of the fitting recess 71 cannot be maintained. When it is determined that the contact of the object being grasped 60 with respect to the opening edge 72 of the fitting recess 71 cannot be maintained, the position shift correction unit 130 temporarily suspends the position shift correction, and moves the object being grasped 60 in the Z direction as well as a direction approaching the fitting recess 71 of the object to be assembled 70, until the sum of forces in the Z direction detected by each tactile sensor unit 13 is the specified value or more (that is, FZ1+FZ2≥1N).

In the second embodiment, the fitting determination unit 111 determines whether the object being grasped 60 contacts with the opening edge 72 of the fitting recess 71 on the basis of whether the sum of forces in the Z direction (that is, FZ1+FZ2) detected by each tactile sensor unit 13 exceeds a specified value (for example, 2N) when the object being grasped 60 approaches the fitting recess 71 of the object to be assembled 70 from the Z direction. The specified value is determined in advance according to the dimensional configuration of each finger 12, or the shape, size, material, and the like of the object being grasped 60.

Subsequently, with reference to FIGS. 14 and 15, a position shift correction process of the object being grasped 60 with respect to the object to be assembled 70 during the fitting process of fitting the object being grasped 60 into the fitting recess 71 of the object to be assembled 70 will be described. The fitting process described below is performed by the control device 100 executing a predetermined program.

Figure 14:
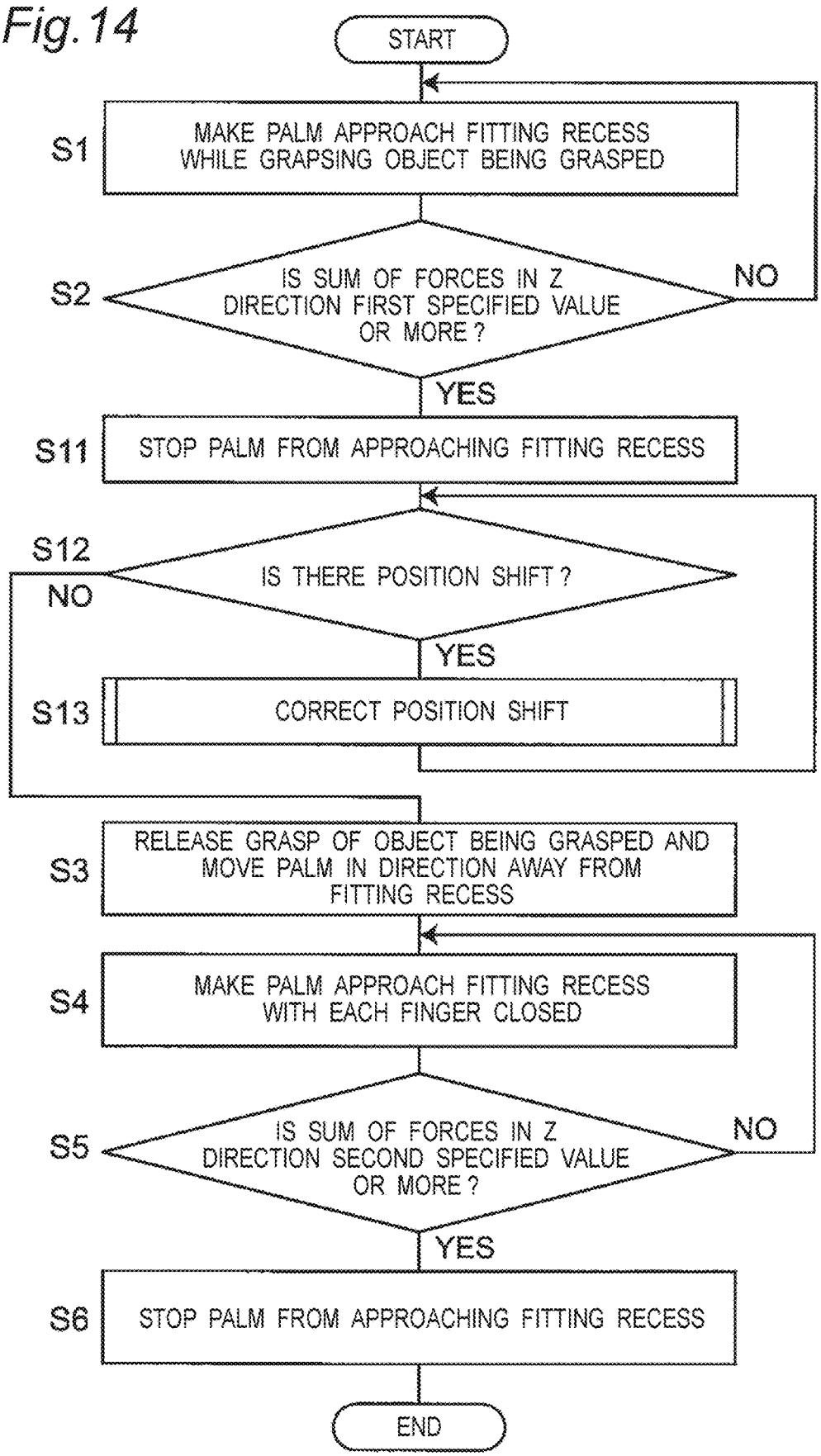
FIG. 14 is a first flowchart for explaining a position shift correction process of the end effector device of FIG. 12.

As shown in FIG. 14, when it is determined in step S2 that the force in the Z direction detected by each tactile sensor unit 13 is the first specified value or more, the fitting control unit 110 stops the palm 11 from moving close to the fitting recess 71 of the object to be assembled 70 (step S11), and the position shift direction determination unit 120 determines whether the object being grasped 60 is position-shifted with respect to the fitting recess 71 (step S12).

Figure 15:
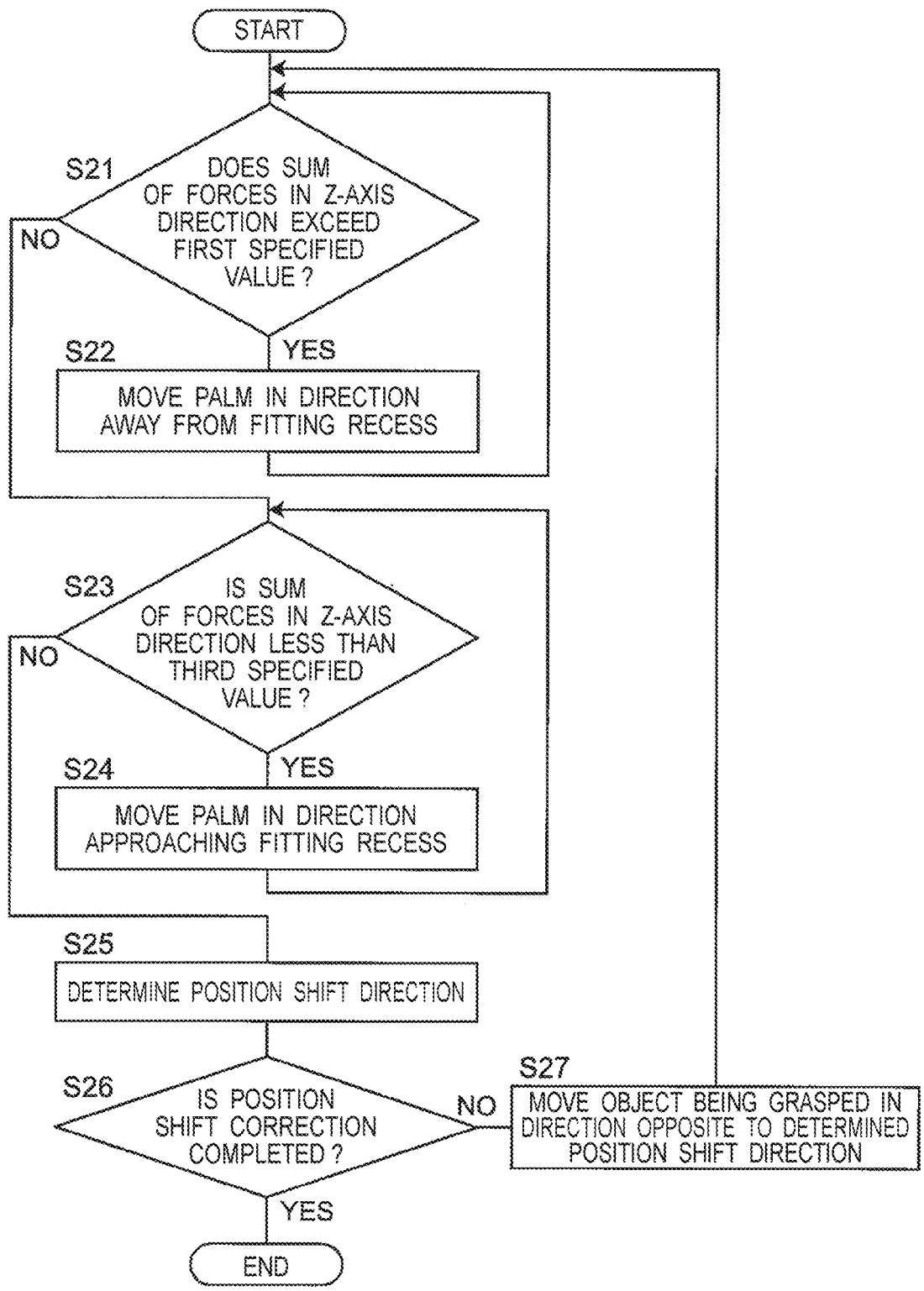
FIG. 15 is a second flowchart for explaining the position shift correction process of the end effector device of FIG. 12.

In this position shift correction, as shown in FIG. 15, the position shift correction unit 130 determines whether the sum of forces in the Z direction (that is, FZ1+FZ2) detected by each tactile sensor unit 13 exceeds the first specified value (for example, 2N) (step S21). When it is determined that the sum of forces in the Z direction detected by each tactile sensor unit 13 exceeds the first specified value, the position shift correction unit 130 does not perform the position shift correction, and moves the object being grasped 60 in the Z direction as well as a direction away from the fitting recess 71 of the object to be assembled 70, until the sum of forces in the Z direction detected by each tactile sensor unit 130 is the first specified value or less (step S22).

When it is determined that the sum of forces in the Z direction detected by each tactile sensor unit 13 does not exceed the first specified value, the position shift direction determination unit 120 determines whether the sum of forces in the Z direction detected by each tactile sensor unit 13 is less than a third specified value (for example, 1N) (step S23). When it is determined that the sum of forces in the Z direction detected by each tactile sensor unit 13 is less than the third specified value (for example, 1N), the position shift correction unit 130 does not perform the position shift correction, and moves the object being grasped 60 in the Z direction as well as a direction approaching the fitting recess 71 of the object to be assembled 70, until the sum of forces in the Z direction detected by each tactile sensor unit 13 is the third specified value or more (step S24).

When it is determined that the sum of forces in the Z direction detected by each tactile sensor unit 13 is not less than the third specified value (for example, 1N), the position shift direction determination unit 120 determines a position shift direction of the object being grasped 60 with respect to the fitting recess 71 (step S25), and determines whether to complete the position shift correction of the object being grasped 60 with respect to the fitting recess 71 (step S26).

When it is determined to complete the position shift correction, the process proceeds to step S3, where the fitting control unit 110 releases the grasp of the object being grasped 60 by each finger 12, and moves the palm 11 in the direction B away from the fitting recess 71 of the object to be assembled 70. When it is determined not to complete the position shift correction, the position shift correction unit 130 moves the object being grasped 60 in a direction opposite to the position shift direction of the object being grasped 60 with respect to the fitting recess 71 determined by the position shift direction determination unit 120 to correct the position shift of the object being grasped 60 with respect to the fitting recess 71 (step S26). Then, returning to step S21, the position shift correction unit 130 determines whether the sum of forces in the Z direction detected by each tactile sensor unit 13 exceeds the first specified value.

In the end effector device 1 of the second embodiment, in a case where the object being grasped 60 and the opening edge 72 of the fitting recess 71 contacts with each other when the palm 11 approaches the fitting recess 71 of the object to be assembled 70 and fitting the object being grasped 60 into the fitting recess 71 of the object to be assembled 70 in a state where the object being grasped 60 is grasped by each finger 12, it is determined whether the object being grasped 60 is position-shifted with respect to the fitting recess 71 based on the detection result detected by each tactile sensor unit 13, and the palm 11 moves in the direction opposite to a direction of the determined position shift of the object being grasped 60 with respect to the fitting recess 71 to correct the position shift of the object being grasped 60 with respect to the fitting recess 71. With such a configuration, it is possible to realize an end effector device 1 capable of correcting the position shift of the object being grasped 60 with respect to the fitting recess 71 of the object to be assembled 70.

The position shift direction determination unit 120 determines the position shift direction of the object being grasped 60 with respect to the fitting recess 71 based on one or more of or all of the sum and differences of the external forces in the same axial direction among the external forces in the at least three axial directions detected by each tactile sensor unit 13. As a result, the position shift direction of the object being grasped 60 with respect to the fitting recess 71 can be determined with a simple configuration.

The position shift correction unit 130 completes the correction of the position shift of the object being grasped 60 with respect to the fitting recess 71 when one or more of or all of the sum and differences of the external forces in the same axial direction among the external forces in the at least three axial directions detected by each tactile sensor unit 13 are the specified value or less. As a result, it is possible to determine whether the correction of the position shift of the object being grasped 60 with respect to the fitting recess 71 is completed with a simple configuration.

The end effector 10 includes a plate-shaped first finger 1201 and a plate-shaped second finger 1202 as a plurality of fingers 12, and a force-receiving portion 14. The plate-shaped first finger 1201 and the plate-shaped second finger 1202 are arranged so that the plate surfaces face each other. The force-receiving portion 14 is connected to the second end portion 122 of each finger 1201, 1202 via the tactile sensor unit 13 and receives a force from the object being grasped 60 when the first finger 1201 and the second finger 1202 grasp the object being grasped 60. The force-receiving portion 14 has a grasping surface 15 and a pressing surface 16. The grasping surface 15 is placed facing the object being grasped 60 in the direction intersecting the extending direction of each finger 1201, 1202 to be able to grasp the object being grasped 60 and receives the force in the direction intersecting the extending direction of each finger 1201, 1202. The pressing surface 16 is placed further away from the palm 11 than the second end portion 122 of each finger 1201, 1202 in the extending direction of each finger 1201, 1202 and extends in a direction intersecting the grasping surface 15 to receive a force in the extending direction of each finger 1201, 1202. With such a configuration, it is possible to realize an end effector device 1 capable of fitting the object being grasped 60 into the fitting recess 71 of the object to be assembled 70 with a simple configuration and correcting the position shift of the object being grasped 60 with respect to the fitting recess 71 of the object to be assembled 70.

In the end effector device 1 of the second embodiment, it is sufficient that the tactile sensor unit 13 can detect an external force in at least three axial directions. A configuration and type of the tactile sensor unit 13 can be set according to a dimensional configuration of each finger 12 or a shape, size, material, and the like of the object being grasped 60. For example, the tactile sensor unit 13 may be configured to be able to detect only external forces in the three axial directions orthogonal to one another, or may be configured to be able to detect moments in each axial direction in addition to the external forces in the three axial directions orthogonal to one another.

When the tactile sensor unit 13 is configured to be able to detect moments in each axial direction in addition to the external forces in the three axial directions orthogonal to one another, for example, the position shift of the object being grasped 60 with respect to the fitting recess 71 in the Y direction can be determined by a difference in moments in the X-axis direction.

When the difference in moments in the X-axis direction is a negative value, it is determined that the object being grasped 60 is shifted in the positive direction of Y with respect to the fitting recess 71. The position shift of the object being grasped 60 with respect to the fitting recess 71 in the X direction can be determined by the difference in moments in the Y-axis direction. When the difference in moments in the Y-axis direction is a positive value, it is determined that the object being grasped 60 is shifted in the positive direction of X with respect to the fitting recess 71.

The position shift of the object being grasped 60 with respect to the fitting recess 71 around the Z direction can be determined by a sum of moments in the Z-axis direction. When the sum of moments in the Z-axis direction is a positive value, it is determined that the object being grasped 60 is shifted around the rotation direction shown by OZ in FIG. 13.

It is sufficient that the end effector 10 includes a palm 11, a plurality of fingers 12 capable of grasping operation of grasping the object being grasped 60, and a tactile sensor unit 13 capable of detecting an external force from the object being grasped 60. The end effector 10 is not limited to the configuration of the second embodiment.

The position shift direction determination unit 120 is not limited to the second embodiment. The position shift direction determination unit 120 may have any configuration that can determine whether the object being grasped 60 is position-shifted with respect to the fitting recess 71 in at least one of the three axial directions based on the detection result detected by the tactile sensor unit 13.

The position shift correction unit 130 is not limited to the second embodiment. The position shift correction unit 130 may have any configuration that can correct the position shift of the object being grasped 60 with respect to the fitting recess 71 by moving the palm 11 in a direction opposite to the position shift direction of the object being grasped 60 with respect to the fitting recess 71 determined by the position shift direction determination unit 120.

As described above, various embodiments of the present disclosure have been described in detail with reference to the drawings, and finally, various aspects of the present disclosure will be described. It is to be noted that in the following description, description will be provided with reference numerals attached thereto as an example.

An end effector 10 of a first aspect of the present disclosure includes:
- a palm 11;
- a plurality of fingers 12 capable of grasping operation in which each of the plurality of fingers 12 moves in a direction intersecting an extending direction thereof as well as approaching each other and grasps an object being grasped 60, a first end portion 121 of each of the plurality of fingers 12 in the extending direction being connected to the palm 11;
- a tactile sensor unit 13 capable of detecting an external force from the object being grasped 60, the tactile sensor 13 being provided at a second end portion 121 of each of the plurality of fingers 12 in the extending direction; and
- a force receiving portion 14 that receives a force from the object being grasped 60 when the object being grasped 60 is grasped by the plurality of fingers 12, the force receiving portion 14 being connected to the second end portion 122 of each of the plurality of fingers 12 via the tactile sensor unit 13, wherein the force receiving portion 14 includes
- a grasping surface 15 that receives a force in the direction intersecting the extending direction, the grasping surface 15 being placed facing the object being grasped 60 in a direction intersecting the extending direction to be able to grasp the object being grasped 60, and
- a pressing surface 16 that receive a force in the extending direction, the pressing surface 16 being placed further away from the palm 11 than the second end portion 122 of each of the plurality of fingers 12 in the extending direction and extending in a direction intersecting the grasping surface 15.

According to the end effector 10 of the first aspect, for example, after grasping it by the grasping surface 15 of the force-receiving portion 14 and moving the object being grasped 60 to the fitting recess 71 of the object to be assembled 70, it is possible to press the object being grasped 60 against the object to be assembled 70 with the pressing surface 16 of the force-receiving portion 14 to fit the object being grasped 60 into the fitting recess 71. That is, it is possible to realize an end effector 10 including a tactile sensor unit 13 capable of fitting the object being grasped 60 into the fitting recess 71 of the object to be assembled 70 with a simple configuration.

In an end effector 10 of a second aspect of the present disclosure,
the force receiving portion 14 covers the tactile sensor unit 13 in the extending direction and in a direction intersecting the extending direction.

According to the end effector 10 of the second aspect, it is possible to more reliably press the object being grasped 60 against the object to be assembled 70 with the pressing surface 16 of the force-receiving portion 14.

In an end effector 10 of a third aspect of the present disclosure,
the force receiving portion 14 includes
a first pressing surface 16 that is the pressing surface, and
a second pressing surface 18 that extends in a direction intersecting the grasping surface 15 and the first pressing surface 16.

According to the end effector 10 of the third aspect, the object being grasped 60 can be fitted into the fitting recess 71 of the object to be assembled 70 in various aspects.

In an end effector 10 of a fourth aspect of the present disclosure,
the force receiving portion 14 includes
a first plate member 141 including the grasping surface,
a second plate member 142 including the pressing surface, and
a connecting portion 17 provided on either the first plate member 141 or the second plate member 142,
one of the first plate member 141 and the second plate member 142 is connected to the second end portion 122 of each of the plurality of fingers 12 via the tactile sensor unit 13, and
the other of the first plate member 141 and the second plate member 142 is connected to the second end portion 122 of each of the plurality of fingers 12 via the connecting portion 17.

According to the end effector 10 of the fourth aspect, the durability of the force-receiving portion 14 can be improved.

In an end effector device 1 according to a fifth aspect of the present disclosure,
an end effector 10 according to any one of the above aspects;
a drive device 30 that drives the palm 11 and each of the plurality of fingers 12; and
a control device 100 that controls the drive device 30 based on a detection result detected by the tactile sensor unit 13.

According to the end effector device 1 of the fifth aspect, it is possible to realize the end effector device 1 capable of fitting the object being grasped 60 into the fitting recess 71 of the object to be assembled 70 with a simple configuration by the end effector 10.

In an end effector device 1 of a sixth aspect of the present disclosure,
the control device 100 includes a fitting control unit 110 that releases the grasp of the object being grasped 60 by each of the plurality of fingers 12 and moves the palm 11 in a direction away from a fitting recess 71 of an object to be assembled 70 in a case where the tactile sensor unit 13 detects that the pressing surface 16 of the force receiving portion 14 contacts with an opening edge 72 of the fitting recess 71 when the palm 11 approaches the fitting recess 71 in a state where the object being grasped 60 is grasped by each of the plurality of fingers 12 to fit the object being grasped 60 into the fitting recess 71.

According to the end effector device 1 of the sixth aspect, it is possible to realize the end effector device 1 capable of fitting the object being grasped 60 into the fitting recess 71 of the object to be assembled 70 with a simple control process by the fitting control unit 110.

In an end effector device 1 of a seventh aspect of the present disclosure,
the fitting control unit 110 moves the palm 11 closer to the fitting recess 71 of the object to be assembled 70 again in a state where each of the plurality of fingers 12 approaches each other and is closed in a direction intersecting the extending direction after moving the palm 11 in a direction away from the fitting recess 71, so that the object being grasped 60 is pressed against the object to be assembled 70 with the pressing surface 16 to fit the object being grasped 60 into the fitting recess 71.

According to the end effector device 1 of the seventh aspect, it is possible to realize the end effector device 1 capable of fitting the object being grasped 60 into the fitting recess 71 of the object to be assembled 70 with a simple control process by the fitting control unit 110.

In an end effector device 1 of an eighth aspect of the present disclosure, the drive device 30 includes an encoder that detects rotation of a motor that drives the palm 11, and the fitting control unit 110 further includes a fitting determination unit 111 that determines whether the fitting of the object being grasped 60 into the fitting recess 71 is completed based on the detection result or based on both the detection result and information output from the encoder when pressing the object being grasped 60 against the object to be assembled 70 with the pressing surface 16 to fit the object being grasped 60 into the fitting recess 71, and the fitting control unit 110 stops the palm 11 from moving closer to the object being grasped 60 when it is determined that the fitting of the object being grasped 60 into the fitting recess 71 is completed.

According to the end effector device 1 of the eighth aspect, it is possible more reliably to fit the object being grasped 60 into the fitting recess 71 of the object to be assembled 70 by the fitting determination unit 111.

Note that, by appropriately combining any of the above-described various embodiments or modifications, it is possible to achieve the effects of the respective embodiments or modifications. In addition, a combination of the embodiments or a combination of the examples or a combination of the embodiment and the example is possible, and a combination of the features in the different embodiments or the examples is also possible.

Although the present disclosure has been fully described in connection with preferred embodiments with reference to the accompanying drawings, various variations and modifications will be apparent to those skilled in the art. It is to be understood that such variations and modifications are included in the appended claims unless the variations and modifications depart from the scope of the present disclosure as set forth in the claims.

INDUSTRIAL APPLICABILITY

The end effector of the present disclosure can be applied to, for example, an end effector device of an industrial robot.

The end effector device of the present disclosure can be applied to, for example, an industrial robot.

REFERENCE SIGNS LIST 1. end effector device
10. end effector
11. palm
12. finger
1201. first finger
1202. second finger
121. proximal end portion
122. tip portion
13. tactile sensor unit
14. force receiving portion
141. first plate member
142. second plate member
143. third plate member
15. grasping surface
16. pressing surface (first pressing surface)
17. connecting portion
18. second pressing surface
20. arm
30. drive device
40. operation unit
50. power source
60. object being grasped
70. object to be assembled
71. fitting recess
72. opening edge
100. control device
110. fitting control unit
111. fitting determination unit
120. position shift direction determination unit
130. position shift correction unit

The invention claimed is:

1. An end effector device, comprising:
an end effector;
a drive device; and
a control device, wherein
the end effector comprises:
a palm;
a plurality of fingers capable of grasping operation in which each of the plurality of fingers moves in a direction intersecting an extending direction thereof as well as approaching each other and grasps an object being grasped, a first end portion of each of the plurality of fingers in the extending direction being connected to the palm;
a tactile sensor unit capable of detecting an external force from the object being grasped, the tactile sensor being provided at a second end portion of each of the plurality of fingers in the extending direction; and
a force receiving portion that receives a force from the object being grasped when the object being grasped is grasped by the plurality of fingers, the force receiving portion being connected to the second end portion of each of the plurality of fingers via the tactile sensor unit,
the force receiving portion includes
a grasping surface that receives a force in the direction intersecting the extending direction, the grasping surface being placed facing the object being grasped in a direction intersecting the extending direction to be able to grasp the object being grasped, and
a pressing surface that receive a force in the extending direction, the pressing surface being placed further away from the palm than the second end portion of each of the plurality of fingers in the extending direction and extending in a direction intersecting the grasping surface,
the drive device is configured to drive the palm and each of the plurality of fingers;
the control device is configured to control the drive device based on a detection result detected by the tactile sensor unit, and
the control device includes a fitting control unit configured to release the grasp of the object being grasped by each of the plurality of fingers and to move the palm in a direction away from a fitting recess of an object to be assembled in a case where the tactile sensor unit detects that the pressing surface of the force receiving portion contacts with an opening edge of the fitting recess when the palm approaches the fitting recess in a state where the object being grasped is grasped by each of the plurality of fingers to fit the object being grasped into the fitting recess.

2. The end effector device according to claim 1, wherein the force receiving portion covers the tactile sensor unit in the extending direction and in a direction intersecting the extending direction.

3. The end effector device according to claim 2, wherein the force receiving portion includes
a first pressing surface that is the pressing surface, and
a second pressing surface that extends in a direction intersecting the grasping surface and the first pressing surface.

4. The end effector device according to claim 3, wherein the force receiving portion includes
a first plate member including the grasping surface,
a second plate member including the pressing surface, and
a connecting portion provided on either the first plate member or the second plate member,
one of the first plate member and the second plate member is connected to the second end portion of each of the plurality of fingers via the tactile sensor unit, and
the other of the first plate member and the second plate member is connected to the second end portion of each of the plurality of fingers via the connecting portion.

5. The end effector device according to claim 2, wherein the force receiving portion includes
a first plate member including the grasping surface,
a second plate member including the pressing surface, and
a connecting portion provided on either the first plate member or the second plate member,
one of the first plate member and the second plate member is connected to the second end portion of each of the plurality of fingers via the tactile sensor unit, and
the other of the first plate member and the second plate member is connected to the second end portion of each of the plurality of fingers via the connecting portion.

6. The end effector device according to claim 1, wherein the force receiving portion includes
a first pressing surface that is the pressing surface, and
a second pressing surface that extends in a direction intersecting the grasping surface and the first pressing surface.

7. The end effector device according to claim 6, wherein the force receiving portion includes
a first plate member including the grasping surface,
a second plate member including the pressing surface, and
a connecting portion provided on either the first plate member or the second plate member,
one of the first plate member and the second plate member is connected to the second end portion of each of the plurality of fingers via the tactile sensor unit, and
the other of the first plate member and the second plate member is connected to the second end portion of each of the plurality of fingers via the connecting portion.

8. The end effector device according to claim 1, wherein the force receiving portion includes
a first plate member including the grasping surface,
a second plate member including the pressing surface, and
a connecting portion provided on either the first plate member or the second plate member,
one of the first plate member and the second plate member is connected to the second end portion of each of the plurality of fingers via the tactile sensor unit, and
the other of the first plate member and the second plate member is connected to the second end portion of each of the plurality of fingers via the connecting portion.

9. The end effector device according to claim 1, wherein the fitting control unit is configured to move the palm closer to the fitting recess of the object to be assembled again in a state where each of the plurality of fingers approaches each other and is closed in a direction intersecting the extending direction after moving the palm in a direction away from the fitting recess, so that the object being grasped is pressed against the object to be assembled with the pressing surface to fit the object being grasped into the fitting recess.

10. The end effector device according to claim 9, wherein
The drive device includes an encoder configured to detect rotation of a motor that drives the palm, and
the fitting control unit further includes a fitting determination unit configured to determine whether the fitting of the object being grasped into the fitting recess is completed based on the detection result or based on both the detection result and information output from the encoder when pressing the object being grasped against the object to be assembled with the pressing surface to fit the object being grasped into the fitting recess, and
the fitting control unit is configured to stop the palm from moving closer to the object being grasped when it is determined that the fitting of the object being grasped into the fitting recess is completed.

\* \* \* \* \*